United States Patent
Siegl

(10) Patent No.: US 6,202,634 B1
(45) Date of Patent: Mar. 20, 2001

(54) PROCESS FOR RECOGNIZING THE IGNITION CYCLE OF A CERTAIN CYLINDER DURING THE START OF AN INTERNAL-COMBUSTION ENGINE

(75) Inventor: Norbert Siegl, Lenggries (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/135,582

(22) Filed: Aug. 18, 1998

(30) Foreign Application Priority Data

Aug. 18, 1997 (DE) .............................. 197 35 720

(51) Int. Cl.$^7$ ..................................................... F02D 45/00
(52) U.S. Cl. ............................. 123/612; 73/116; 701/105
(58) Field of Search ..................... 123/406.58, 406.62, 123/476, 477, 612, 613, 617; 701/105, 113; 73/116, 117.3, 118.1, 117.2

(56) References Cited

U.S. PATENT DOCUMENTS

| 4,365,602 | * | 12/1982 | Stiller et al. | 123/406.58 |
| 5,156,125 | * | 10/1992 | Fukui et al. | 123/406.62 |
| 5,469,823 | * | 11/1995 | Ott et al. | 123/406.62 |

FOREIGN PATENT DOCUMENTS

| 144 291 | 10/1980 | (DE) . |
| 32 33 635 | 5/1983 | (DE) . |
| 35 23 250 | 6/1985 | (DE) . |
| 39 08 694 | 3/1989 | (DE) . |
| 39 32 072 | 4/1990 | (DE) . |
| 39 33 987 | 4/1990 | (DE) . |
| 39 36 259 | 5/1990 | (DE) . |
| 4129714 | * | 3/1993 | (DE) . |
| 195 24 112 | 2/1996 | (DE) . |
| 0 638 717 | 7/1994 | (EP) . |
| 2 637 652 | 4/1990 | (FR) . |
| 2 724 416 | 3/1996 | (FR) . |

OTHER PUBLICATIONS

*VDI Publishers*, 1994, p. 224, et seq. entitled "Rotational Spped, Crankshaft and Camshaft Position".

* cited by examiner

*Primary Examiner*—Andrew M. Dolinar
(74) *Attorney, Agent, or Firm*—Evenson, McKeown, Edwards, & Lenahan, P.L.L.C.

(57) ABSTRACT

In the case of a process for recognizing the ignition cycle of a defined cylinder during the start of an internal-combustion engine in motor vehicles using a crankshaft angle sensor which interacts with a crankshaft generator gear equipped with teeth and with a reference mark, a camshaft angle sensor for differentiating between the ignition cycle and the exhaust cycle of the cylinders, and an electronic control unit, the high levels and the low levels as well as the descending and the ascending edges of the signal of the camshaft angle sensor are analyzed in the control unit and are related to the signal of the crankshaft sensor.

6 Claims, 3 Drawing Sheets

PROCESS FOR RECOGNIZING THE IGNITION CYCLE OF A CERTAIN CYLINDER DURING THE START OF AN INTERNAL-COMBUSTION ENGINE

BACKGROUND AND SUMMARY OF THE INVENTION

This application claims the priority of German Patent Application No. 197 35 720.2, filed Aug. 18, 1997, the disclosure of which is expressly incorporated by reference herein.

The invention relates to a process for recognizing the ignition cycle of a certain cylinder during the start of an internal-combustion engine in a motor vehicle and, more particularly, to a process using a crankshaft angle sensor which interacts with a crankshaft generator gear equipped with teeth and a reference mark, a camshaft angle sensor for differentiating between the ignition cycle and the exhaust cycle of the cylinders, and an electronic control unit.

Such a process is described, for example, in the chapter entitled "Rotational Speed, Crankshaft and Camshaft Position" of the technical manual "Autoelectric System, Autoelectronic System on the Otto Engine" of the firm Bosch, VDI Publishers, 1994, Pages 224, et seq. This known process is carried out by means of a crankshaft angle sensor (rotational speed sensor), by means of a camshaft angle sensor (Hall sensor) and by means of an electronic control unit (Motronic). The crankshaft angle sensor interacts with a generator gear which is mounted on the crankshaft and is equipped with a plurality of teeth, and includes small tooth gaps as well as one large tooth gap. In the control unit, the signal of the crankshaft angle sensor is converted to a square wave voltage with a constant amplitude. In this case, a high level corresponds to a tooth and a low level corresponds to a tooth gap. For determining the angular position of the internal-combustion engine, the edge distances of the square wave voltage are analyzed. The large tooth gap is assigned to a defined crankshaft position of cylinder one.

The basis of the known process as well as that of the invention is a four-cycle internal-combustion engine. The cylinders of a four-cycle internal-combustion engine are offset with respect to one another such that, after two crankshaft rotations, cylinder one will start the operating cycle again. The piston position of a cylinder is used as the measurable variable for determining the ignition point in time. The pistons of all cylinders are connected with the crankshaft via connecting rods. The crankshaft angle sensor therefore also supplies the information concerning the piston position of all cylinders.

The camshaft controls the inlet valves and the outlet valves of the engine. It therefore rotates half as fast as the crankshaft. When a piston moves to the upper (top )dead center (UDC) position (which corresponds, for example, to the large tooth gap for cylinder one), the camshaft determines whether the cylinder is in the ignition cycle or in the exhaust cycle by the position of the inlet and outlet valves. This information cannot be obtained from the crankshaft position alone. Even if the point in time of the injection is individually adapted for each cylinder (sequential injection), the information concerning the camshaft position is required.

In the case of the known process for recognizing the ignition cycle of cylinder one, the control unit examines whether, during the passing of the (large) generator gear tooth gap, the signal of the camshaft angle sensor has a high or a low level. In the following, the large tooth gap will be called the reference mark.

In the case of the known process, for recognizing the ignition cycle of a certain cylinder for the synchronization of the ignition and/or the injection, during the start of the internal-combustion engine, almost two crankshaft rotations may be required. This delays the starting time of an internal-combustion engine because until the synchronization, no angle-synchronous emission of the ignition and/or injection is possible.

It is therefore an object of the present invention to achieve synchronization of the crankshaft-angle-synchronous events (ignition and injection) as fast as possible.

This object is achieved by a process and arrangement for recognizing the ignition cycle of a certain cylinder during the start of an internal-combustion engine in motor vehicles using a crankshaft angle sensor which interacts with a crankshaft generator gear equipped with teeth and a reference mark, a camshaft angle sensor for differentiating between the ignition cycle and the exhaust cycle of the cylinders, and an electronic control unit. The high and the low levels as well as the descending and ascending edges of the signal of the camshaft angle sensor are analyzed in the control unit and are related to the signal of the crankshaft sensor to recognize the ignition cycle. In the arrangement, the camshaft generator gear is a half-segment disk and is arranged relative to the crankshaft generator gear such that the descending and the ascending edge of the signal of the camshaft sensor each occur at least approximately after half a crankshaft rotation starting with the reference mark of the crankshaft generator gear.

The process according to the invention and the arrangement according to the invention permit a clear synchronization after maximally half a crankshaft rotation.

Other objects, advantages and novel features of the present invention will become apparent from the following detailed description of the invention when considered in conjunction with the accompanying drawings.

DETAILED DESCRIPTION OF THE DRAWINGS

FIGS. 1 to 4 illustrate timing diagrams of the signal NW of the camshaft angle sensor, of the signal KW of the crankshaft angle sensor and of the signals for the ignition Z Z1 to Z Z4 as well as for the injection E Z1 to E Z4 for the four cylinders of the internal-combustion engine (which is not shown here). These time sequences each begin at the start of the internal-combustion engine based on four different positions of the crankshaft and of the camshaft which may occur at the engine discharge. For a further explanation of the signal KW of the crankshaft, reference is made in a supplementary manner to Pages 224 and 225 of the above-mentioned technical manual, which description is incorporated herein by reference as non-essential matter.

The hatched surface of the crankshaft signal KW corresponds to the succession of fifty-eight (58) teeth. The signal gap corresponds to the reference mark in the form of a large tooth gap on the crankshaft generator gear. However, in FIGS. 1 to 4, two crankshaft rotations, which correspond to one camshaft rotation, are counted according to the number of teeth so that the first tooth after the reference mark before the first rotation is marked 1 and the first tooth after the reference mark before the second rotation is marked 61.

Figure 5:
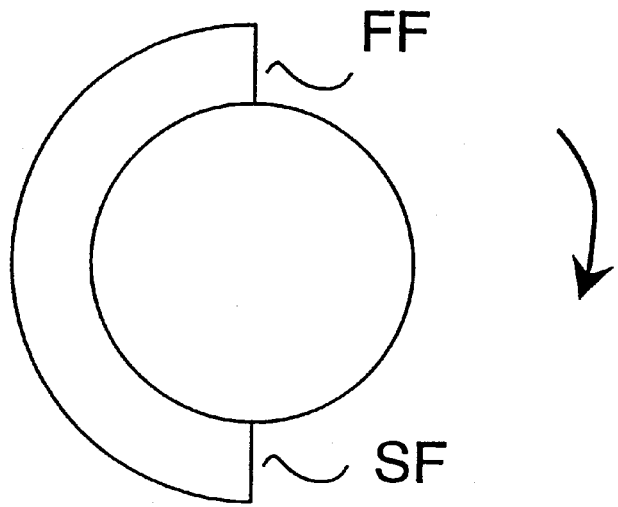
FIG. 5 shows a camshaft generator gear in the form of a half-segment disk.

The camshaft generator gear is arranged in the form of a half-segment disk (see FIG. 5) with respect to the crankshaft generator gear such that the descending and the ascending edge of the signal NW of the camshaft sensor each occur approximately after half a crankshaft rotation starting with the reference mark. In the present case, the ascending edge is assigned to pulse 35 of the crankshaft signal KW and the descending edge is assigned to pulse 95 of the crankshaft signal KW. The pulse 35 corresponds to the 35th tooth on the crankshaft generator gear during the first crankshaft rotation and pulse 95 corresponds to the 35th tooth of the crankshaft generator gear during the second crankshaft rotation.

Figure 1:
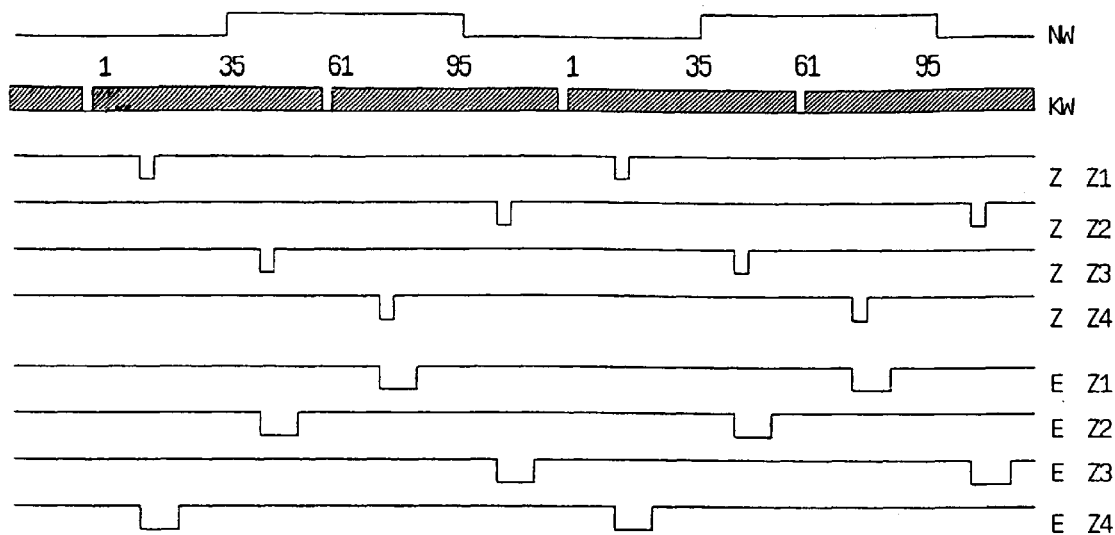
FIG. 1 illustrates a first possible synchronization point according to the process of the invention and the arrangement of the invention in an example of a four-cycle four-cylinder internal-combustion engine.
Figure 2:
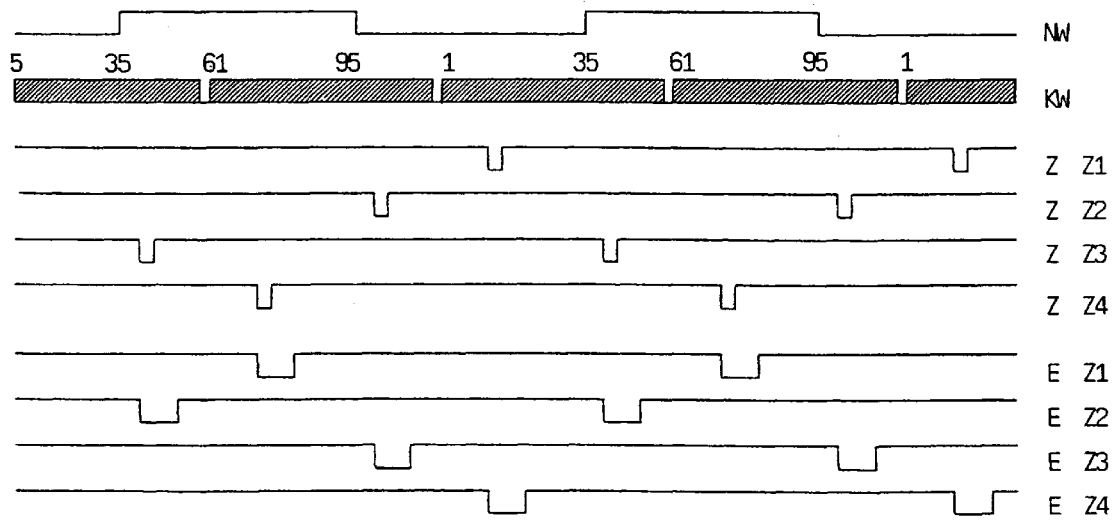
FIG. 2 illustrates a second possible synchronization point according to the process of the invention and the arrangement of the invention in an example of a four-cycle four-cylinder internal-combustion engine.

Shortly after the start of the internal-combustion engine, in FIG. 1, the synchronization of the ignition Z Z1 of the first cylinder and the injection E Z4 of the fourth cylinder upon the occurrence of pulse 1 of the crankshaft signal KW takes place, at which time the camshaft signal NW has a low level. In FIG. 2, the synchronization takes place in the case of the ascending edge of the camshaft signal NW to which the pulse 35 of the crankshaft signal KW is assigned. In the case of the ascending edge of the camshaft signal NW, the synchronization for the ignition Z Z3 of the cylinder 3 and for the injection E Z2 for the cylinder 2 takes place with the assumption that the pulse of the crankshaft signal KW, which occurs with the ascending edge of the camshaft signal NW is the 35th pulse. If this assumption is incorrect, for example, because of slight errors, a correction will be possible at the latest by means of the next reference mark.

Figure 3:
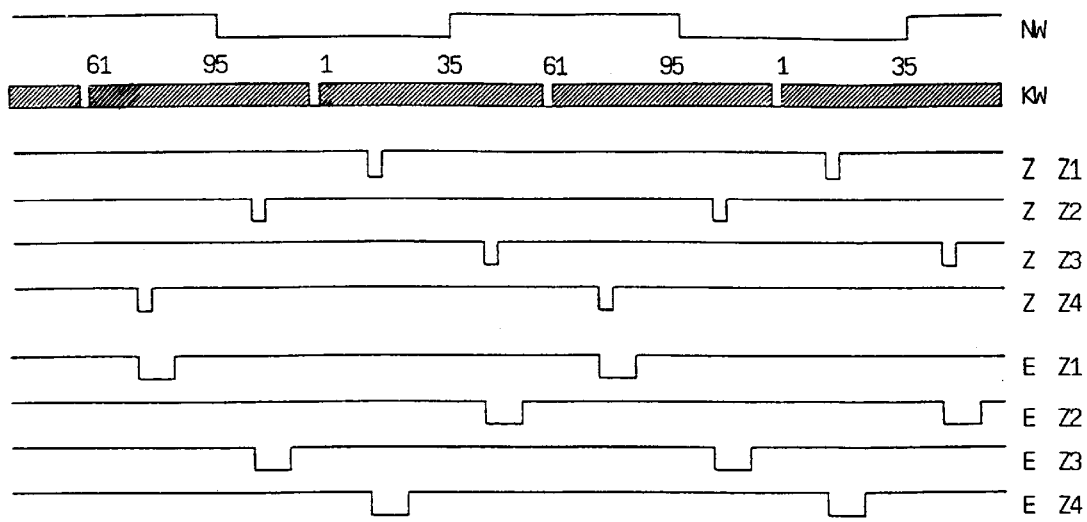
FIG. 3 illustrates a third possible synchronization point according to the process of the invention and the arrangement of the invention in an example of a four-cycle four-cylinder internal-combustion engine.

In FIG. 3, the synchronization takes place at pulse 61 of the crankshaft signal KW, at which time the camshaft signal NW has a high level. Subsequently, the synchronization takes place for the ignition Z Z4 in the fourth cylinder and for the injection E Z1 into the first cylinder.

Figure 4:
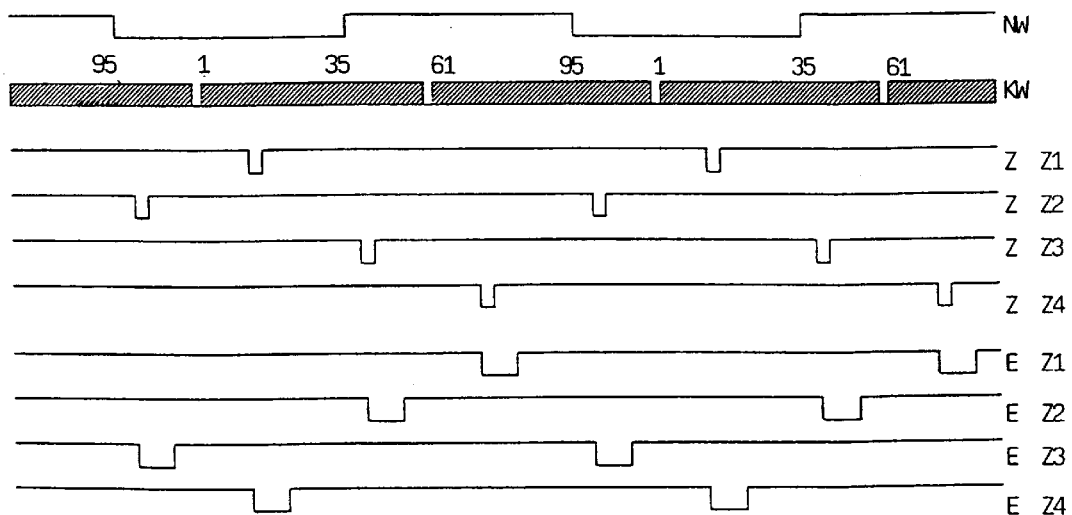
FIG. 4 illustrates a fourth possible synchronization point according to the process of the invention and the arrangement of the invention in an example of a four-cycle four-cylinder internal-combustion engine.

In FIG. 4, the synchronization takes place with the first descending edge of the camshaft signal NW with the assumption of the presence of the pulse 95 in the case of the crankshaft signal KW. Subsequently, the injection Z Z2 in the second cylinder and the injection E Z3 into the third cylinder take place. The ignition and injection sequences after the synchronization are determined in the usual manner.

By means of the embodiment according to the invention, it is shown that four, approximately equally distributed synchronization points after the start of an internal-combustion engine can be obtained such that maximally half a rotation of the crankshaft is required for synchronization. In the case of a four-cycle four-cylinder internal-combustion engine, the ignition cycle of each cylinder following the start can therefore be recognized. Thus, already at the start of the internal-combustion combustion engine, an angularly correct definition of the ignition and the injection is possible.

Figure 6:
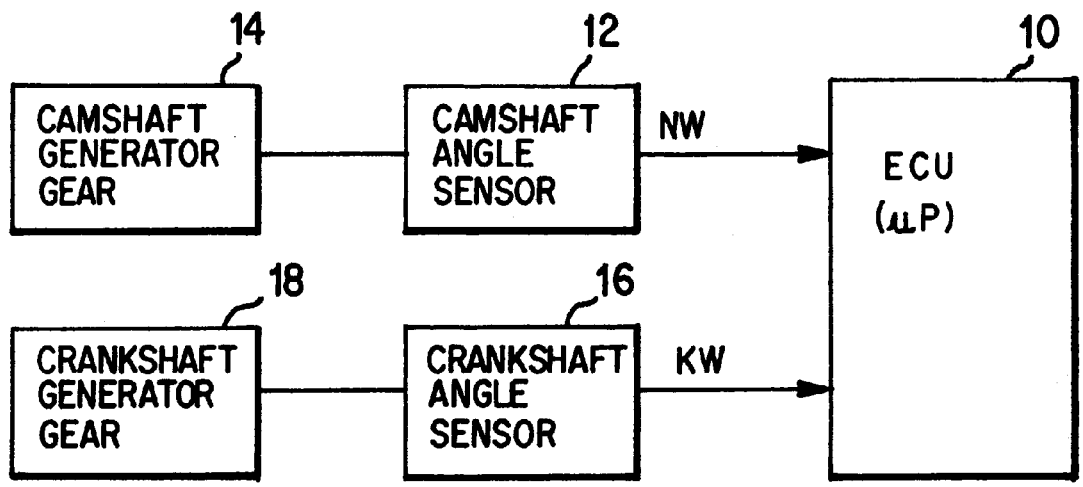
FIG. 6 is a schematic block diagram of the arrangement for performing the process according to the invention.

FIG. 6 is a schematic block diagram illustrating the electronic control unit 10, which for example may be a microprocessor based control unit, receiving the camshaft angle sensor signal NW from a camshaft angle sensor 12 which detects the camshaft generator gear 14. The electronic control unit 10 also receives the crankshaft angle sensor signal KW from the crankshaft angle sensor 16 which detects that crankshaft generator gear 18. The process according to the present invention can be performed by an appropriately programmed electronic control unit 10 which performs the recognition of a particular cylinder of an internal-combustion engine during the start of the engine in accordance with the actions discussed above.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for recognizing an ignition cycle of a defined cylinder during a start of an internal-combustion engine, the process comprising the acts of:
   determining a crankshaft signal via a crankshaft angle sensor interacting with a crankshaft generator gear equipped with a plurality of teeth and a reference mark;
   determining a camshaft signal via a camshaft angle sensor for differentiating between the ignition cycle and an exhaust cycle of cylinders of the internal-combustion engine; and
   analyzing in an electronic control unit for the presence of any one of high and low levels, as well as descending and ascending edges of the camshaft signal in relation to the crankshaft signal to recognize the ignition cycle of the defined cylinder.

2. The process according to claim 1, wherein said internal-combustion engine is a motor vehicle engine.

3. The process according to claim 1, further comprising the act of arranging a half-segment disk-shaped camshaft generator gear relative to the crankshaft generator gear such that the descending and ascending edges of the camshaft signal from the camshaft sensor each occur at least approximately after one-half a crankshaft rotation beginning with the reference mark.

4. An arrangement for performing a process of recognizing an ignition cycle of a defined cylinder during a start of an internal-combustion engine, the arrangement comprising:
   a crankshaft generator gear provided with a plurality of teeth and a reference mark;
   a crankshaft angle sensor interacting with the crankshaft generator gear to provide a crankshaft signal;
   a camshaft generator gear having a half-segment disk shape;
   a camshaft angle sensor interacting with the camshaft generator gear to provide a camshaft signal, said camshaft generator gear being arranged relative to the crankshaft generator gear such that descending and ascending edges of the camshaft signal from the camshaft sensor each occur at least approximately after one-half a crankshaft rotation beginning with the reference mark of the crankshaft generator gear; and
   an electronic control unit which receives the crankshaft signal and the camshaft signal, the electronic control unit recognizing the ignition cycle of the defined cylinder based on said signals.

5. The arrangement according to claim 4, wherein said internal-combustion engine is a motor vehicle engine.

6. A software product comprising a computer readable medium having stored thereon program code segments that:

- determine a crankshaft signal via a crankshaft angle sensor interacting with a crankshaft generator gear equipped with a plurality of teeth and a reference mark;
- determine a camshaft signal via a camshaft angle sensor for differentiating between the ignition cycle and an exhaust cycle of cylinders of the internal-combustion engine; and
- analyze in an electronic control unit for the presence of any one of high and low levels, as well as descending and ascending edges of the camshaft signal in relation to the crankshaft signal to recognize the ignition cycle of the defined cylinder.

\* \* \* \* \*